Dec. 27, 1949   C. W. STRAW   2,492,718
NAVIGATION INSTRUMENT
Filed March 22, 1945
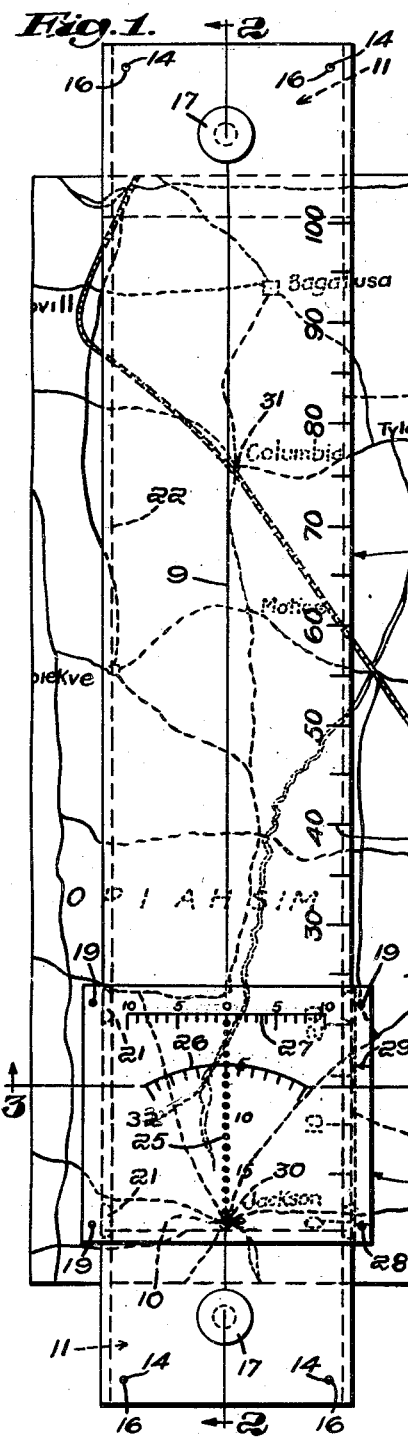
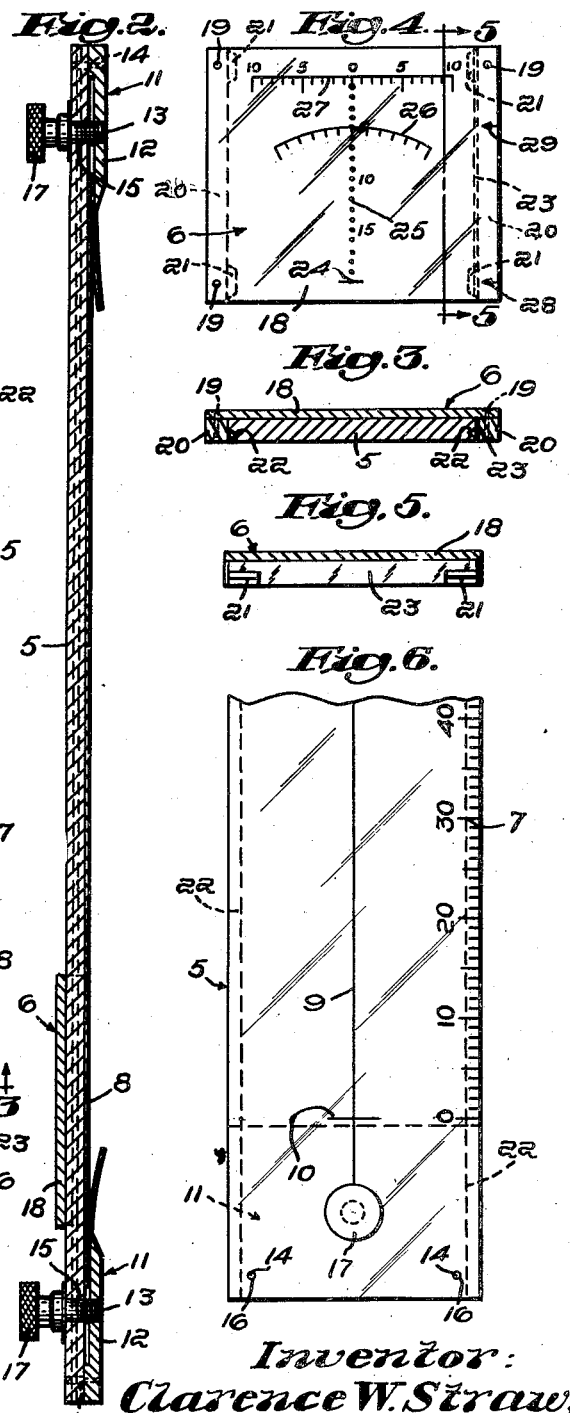
Inventor:
Clarence W. Straw,
by Spears Grier
Attorneys Patented Dec. 27, 1949

2,492,718

UNITED STATES PATENT OFFICE 2,492,718

NAVIGATION INSTRUMENT

Clarence W. Straw, Hill, N. H.

Application Mar. 22, 1945, Serial No. 584,180

6 Claims. (Cl. 33—103)

My present invention relates to a navigation instrument particularly adapted for use in navigating smaller aircraft.

Considerable difficulty is commonly experienced in navigating such aircraft and this is due to several factors, such as their lightness, the limited number of instruments with which they are equipped, and the necessity of each pilot doing his own navigating.

As illustrative of such difficulties, it will be helpful to consider the manner in which maps are widely used by the pilots of small airplanes. A pilot draws on his map a line indicating the line of flight between air fields. The map is then folded to be more compact and placed where he may consult it from time to time to make such corrections in his course as appear to be necessary based on a comparison of his observations with the course marked on his map. This procedure is objectionable in that the map slips from its place or becomes unfolded and because it is difficult to be at all accurate in determining the extent to which a pilot is off his course by comparing his observations with the marked course on the map.

In accordance with my invention, I provide an instrument comprising an elongated base of transparent stock having straight parallel sides and carrying a clamping member at each of its ends so that the map and the instrument may be clamped together in desired relation. The base has, adjacent one edge, a series of transverse graduations of the same scale as the scale of the map, a center line, and a marker disposed at right angles to the center line and transversely alined with the first graduations of the series.

A slide of transparent stock is mounted on the base and it has a centrally disposed marker registrable with the marker on the base. The slide also has at least one transversely disposed set of graduations spaced from the marker on the slide a distance equal to a predetermined number of graduations of the series thereof with which the base is provided. The transversely disposed set of graduations may be an arcuate scale readable in terms of degrees to the right or to the left of the base center line or it may be a scale readable in terms of miles to the right and to the left of said center line. Preferably, the slide has both scales to afford to the pilot the advantages of each type.

With such an instrument, the pilot merely folds the map to the desired length and clamps the map to the instrument with the marker on the base over the point of take-off and the base center line extending to his destination. He then positions the slide with its marker in registry with the base marker.

It will be apparent that the pilot is relatively familiar with the terrain either within a few miles of the air field from which he is taking off or that he can readily find out certain easily identified objects in its vicinity. In the use of the instrument, he selects an object or objects substantially the same distance from the air field as the distance between the marker on the slide and one of the slide scales.

In flight, the pilot follows the course indicated by the center line of the base. When he observes one or more of the selected objects, he knows that he has flown a predetermined number of miles and he knows the time required by that part of his flight. By selecting an identifiable point which he is over and locating that point on the map through his instrument, he immediately knows either in terms or degrees or miles the extent to which he is off course and can make such corrections as appear to be necessary to bring him back on course. By advancing the slide along the base, the pilot is easily able to maintain a continuous check on his course so that instruments in accordance with my invention are well adapted to overcome the difficulties of navigating small aircraft.

In the accompanying drawings, I have shown an illustrative embodiment of my invention from which its novel features and advantages will be readily apparent. In the drawings:

Fig. 1 shows, in plan view, an instrument in accordance with my invention, clamped to an indicated map.

Figs. 2 and 3 are sections along the lines 2—2 and 3—3, respectively, of Fig. 1.

Fig. 4 is a plan view of the slide.

Fig. 5 is a section along the lines 5—5, of Fig. 4, and

Fig. 6 is a fragmentary plan view of the base.

A navigation instrument in accordance with my invention consists of a base 5 of transparent stock and a slide generally indicated at 6.

The base 5 is elongated and has straight parallel sides adjacent one of which there is a series of transversely disposed graduations establishing a scale 7. The series of graduations of the scale 7 are of the same scale as that of the map, indicated at 8. The base 5 has a center line 9 and a marker 10 disposed at right angles to the center line 9 and transversely alined with the first or "zero" graduations of the scale 7. I have shown the scale 7 as numbered by tens up to 100, but obviously the instrument may be made for use when flights of more than 100 miles are contemplated.

At each end of the base 5 I provide clamps generally indicated at 11. The clamps 11 may conveniently each consist of a plate 12 carrying a threaded element 13 and a pair of pins 14. Each end of the base 5 has an aperture 15 to receive a threaded element 13 and a pair of pin receiving holes 16. At 17, I have indicated nuts threaded on each of the elements 13 to permit the plates 12 to be adjusted into and out of map clamping relation to the base 5.

The slide 6 preferably comprises a member 18 of transparent stock slightly wider than the base 5 and to its margins I attach by means of screws, indicated at 19 side pieces 20 each having a pair of spaced projections 21 entrant of slideways 22 in the base 5. The slideways 22 are preferably V-shaped. At 23 I have indicated a spring cut away at its ends to receive the projections 21. In the assembled instrument, movement of the slide 6 is limited by the nuts 17.

I provide the member 18 with a marker 24 registrable with the marker 10 on the base 5. The marker 24 is preferably the first of a series of graduations establishing a scale 25 in alinement with the center line 9 of the base 5 and corresponding to a predetermined number of graduations of the scale 7.

The scale 25 comprises, in the embodiment of my invention shown in the drawings, graduations equivalent to 20 miles on the scale 7 or on the map 8. At the equivalent of 15 miles on the scale 25, I provide a scale 26, arcuate with respect to the marker 24 and readable in terms of degrees to the right or to the left relative to the scale 25. At the equivalent of 20 miles on the scale 25 I provide a second transverse scale 27 readable in terms of miles to the right or left of the scale 25. At 28 and 29 I have indicated as by arrows or like marginal indicia the zero and 15 mile graduations of the centrally disposed scale 25. The graduations of the scale 25 are preferably in the form of dots in order to permit them to be easily distinguished from the center line on the base 5.

With the instrument in accordance with my invention, the pilot merely folds the map 8 so that it may be clamped to the instrument with the marker 10 over air field 30 from which he is taking off and the center line 9 extending to the air field of destination indicated at 31. He then positions the slide 6 relative to the base 5 to bring the marker 24 in registry with the marker 10.

The pilot, before taking off from the air field 30 familiarizes himself with some easily identified point or points known to be in an area in the general direction of his course and substantially the distance from the air field 30 as is indicated by the distance between the marker 24 and whichever of the scales 26 and 27 he prefers to select, generally the scale 26. He then flies and checks his time until he is over the area of the selected point. For example, he may find himself over the point 32 in that area and by checking that point on the map 8 through the instrument, he can determine his off course position in terms of both degrees and miles and can make appropriate corrections in his course in accordance with his observations. The slide 6 may then be re-positioned to bring its marker 24 in transverse alinement with that identified point and the course may again be verified after flying a predetermined number of miles, with such adjustments as his time check indicates, on his corrected course.

From the foregoing, it will be apparent that my instruments are simple in construction and easy to use with the result that accurate navigation of light aircraft is much simplified.

What I therefore claim and desire to secure by Letters Patent is:

1. A navigation instrument for aircraft comprising an elongated transparent base to be disposed over a map, said base having straight parallel sides, a pair of spaced map clamping means to engage and clamp the map against the under surface of the base, a series of transverse graduations establishing a scale adjacent one side with each graduation representing a predetermined distance on the scale of the map, a center line and a marker on said center line transversely alined with the first graduation of the scale, and a slide of transparent stock on the base, said map clamping means constituting stops limiting movement of said slide relative to said base, said slide having a marker and a transverse scale spaced from the marker on the slide a distance equal to a predetermined number of units of the scale on the base, said instrument being disposable on the map with the marker of the base over the take-off and with the center line extending to the destination and having an operative position in which the marker of the slide is positioned with reference to the marker on the base so that the marker on the slide is transversely alined with the first graduation of the scale on the base so that by selecting a known point on the ground below the aircraft in an area known to be of substantially the same distance from the take-off as indicated by the location of the scale on the slide with reference to the slide marker, the location of that point on the map as viewed through the scale on the slide reveals the off course position of the aircraft.

2. The instrument of claim 1, in which the clamping means are located at each end of the base and each of the clamping means comprises a plate, a threaded element and a pair of pins on the plate, and the base has an aperture for the element and a pair of recesses for the pins, and a nut threaded on the element adjustably assembles the clamping means to the base.

3. A navigation instrument for aircraft comprising an elongated transparent base to be disposed over a map and having straight parallel sides, a series of transverse graduations adjacent one side with each graduation representing a predetermined distance on the scale of the map, a center line, a transparent member having a centrally disposed series of graduations with each graduation representing said predetermined distance on the scale of the map with one of said graduations constituting a marker, and a transversely disposed scale spaced from said marker, and means slidably connecting said member to said base so that in any of its positions on said base its centrally disposed series of graduations is in registry with a part of said center line so that when said instrument is disposed on the map with the center line extending through a known point thereon to the destination and the marker on the member is in registry with that point, a known point on the ground below the aircraft of substantially the same distance from said known point on the map and of substantially the same distance therefrom as indicated by the location of the scale on the member reveals, when viewed on the map through the instrument, the off course position of the aircraft.

4. The instrument of claim 3 in which the center line on the base has a marker with which the marker on the member is registerable and which is transversely alined with the first graduation of the series thereof on the base.

5. The instrument of claim 3 in which the transversely disposed scale on the member is a series of graduations arcuately disposed with reference to the marker on that member.

6. The instrument of claim 3 in which the transversely disposed scale on the member is a series of graduations of the same scale as the map.

CLARENCE W. STRAW.

REFERENCES CITED

The following references are of record in the file of this patent:

UNITED STATES PATENTS

| Number | Name | Date |
|---|---|---|
| 280,328 | Putnam | June 26, 1883 |
| 1,215,441 | Walker | Feb. 13, 1917 |
| 1,215,663 | Krueger | Feb. 13, 1917 |
| 1,245,311 | Black | Nov. 6, 1917 |
| 1,656,673 | Haugen | Jan. 17, 1928 |
| 2,159,562 | McCluskey | May 23, 1939 |
| 2,238,190 | Sawtelle | Apr. 15, 1941 |
| 2,331,298 | Bennett | Oct. 12, 1943 |